No. 714,105. Patented Nov. 18, 1902.
G. EVANS.
DENTAL HEATER.
(Application filed Aug. 14, 1902.)
(No Model.)
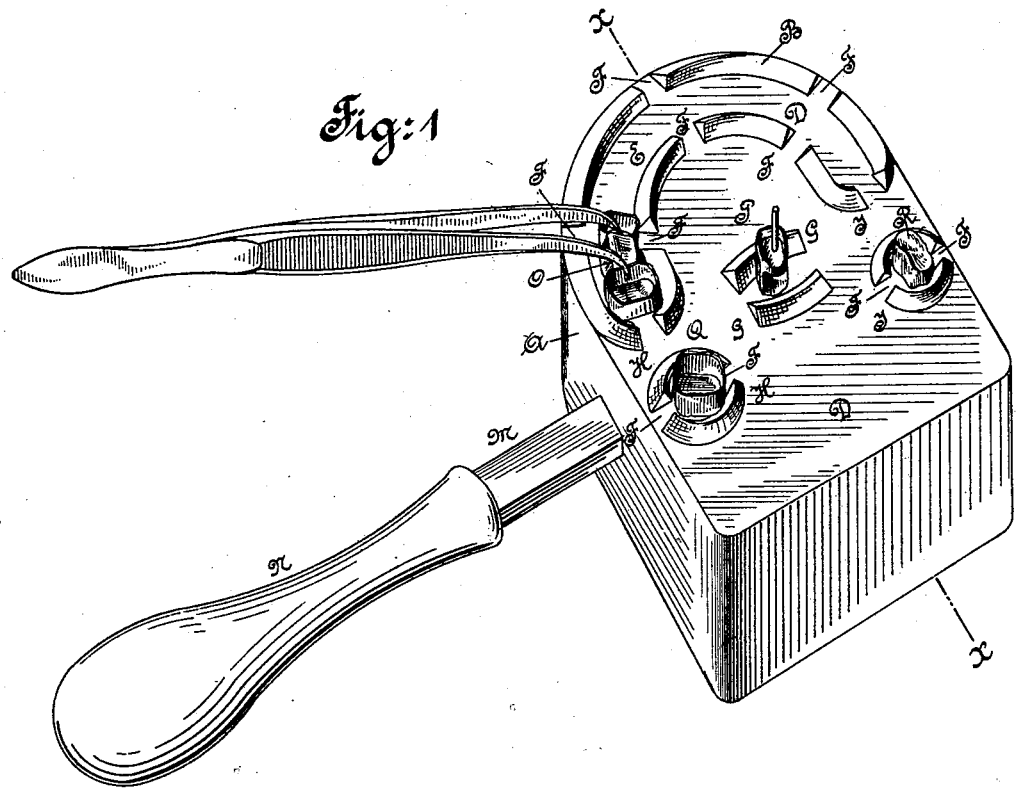
Fig: 1
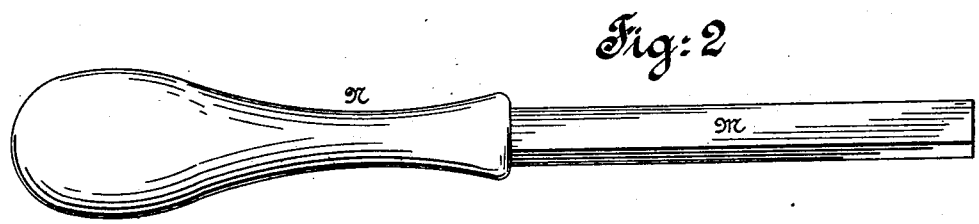
Fig: 2
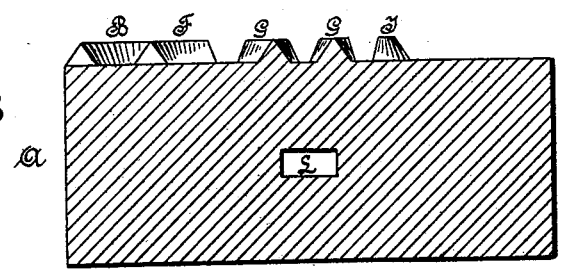
Fig: 3
Witnesses
Max B. A. Doring.
Joseph J. Jacob.
Inventor
George Evans
By his Attorney Witton Lehdon
THE NORRIS PETERS CO., PHOTO-LITHO., WASHINGTON, D. C.

UNITED STATES PATENT OFFICE.

GEORGE EVANS, OF NEW YORK, N. Y., ASSIGNOR TO THE EVANS COMPANY, OF NEW YORK, N. Y.

DENTAL HEATER.

SPECIFICATION forming part of Letters Patent No. 714,105, dated November 18, 1902.

Application filed August 14, 1902. Serial No. 119,627. (No model.)

*To all whom it may concern:*

Be it known that I, GEORGE EVANS, a citizen of the United States, residing at New York, borough of Manhattan, in the county of New York and State of New York, have invented certain new and useful Improvements in Dental Heaters; and I do hereby declare the following to be a full, clear, and exact description of the invention, such as will enable others skilled in the art to which it appertains to make and use the same.

My invention relates to a dental implement for the preparation of plastic cement (gutta-percha, for example) for filling cavities in teeth and for facilitating the application of the heated and softened cement to artificial crowns and bridgework preparatory to cementation.

For the purpose of softening gutta-percha for filling cavities in the teeth or cementation of crowns it has been the custom to place it on a slab or suitably-shaped piece of metal, china, or glass heated by a flame, electricity, steam, or hot water.

The object of this invention is to provide in a single implement a heater for heating and softening the cement, a palette for working the cement, and means for retaining the denture in position while being heated and permit it to be held while the cement is applied to the crown or crowns.

To this end my invention consists in a slab for heating and softening the cement having a part of its surface arranged to serve as a palette for the working of the cement and on another part of its surface having projections arranged for holding the denture in position while heating and assist in holding the same while the cement is applied.

In the accompanying drawings, Figure 1 is a perspective view of my improved dental implement with its removable handle in position and a piece of bridgework and single crowns held in position for heating and the piece of bridgework grasped by the tweezers and held by them between the projections preparatory to applying the cement. Fig. 2 is the handle detached. Fig. 3 is a section of the implement, taken on line $x$ $x$ of Fig. 1.

Referring to the drawings, A designates a block of metal. On the upper surface of this block there are two lines of projections B D, partly inclosing a space E, that conforms to the general shape of a piece of bridgework. The continuity of the projections is broken at intervals by apertures F, which permit the points of tweezers or other tool or instrument that may be available to be used to assist in holding the bridgework in position while heated and the hot cement applied to the inside of the caps or crowns, as shown in Fig. 1.

G G, H H, I I are other projections on the surface of the block, each of which incloses a space into which a crown may be inserted and held in position. The projections G G are particularly adapted to receive an incisor-crown, H H a molar-crown, and I I a bicuspid-crown. There are apertures F in each of these projections to admit the tweezers to grasp and hold the crown while the hot cement is placed in it. These projections on the surface of the slab are thus arranged and adapted to receive and retain any form of crown singly and also a part of or an entire bridge while heating, and when ready they can be easily and quickly grasped by the tweezers, the apertures permitting any part of the crowns or the bridgework to be seized by them and with the aid of the projections hold them while the cement is applied.

D is a space or plain surface reserved on the slab for the cement, which is placed thereon and heated and softened and worked by means of a spatula preparatory to applying it to the crowns.

L is an aperture formed in the block to receive the shank M of a handle N for lifting and moving the block when heated by any suitable or convenient means—for example, by a Bunsen flame, spirit-lamp, or electricity—until it is at a temperature where it will sizz when touched with the wet finger or water dropped upon it will sizz or evaporate instantly. It is then placed in position for use by means of the handle, which is afterward removed. The denture to be cemented is then placed with the base of the crown upward between the projections suitable for it—if part of bridgework, as O, in the corresponding space between the projections B D; if an incisor-crown P, between the projections G G; if a molar-crown Q, between the projections H H, and if a bicuspid R, between the projections I I, as indicated in Fig. 1. The heat of the block is communicated to the denture, which is thus brought to the proper temperature for cementation. The cement is placed on the slab at D and being heated and softened by the heat of the block it is worked, the surface D serving as a palette, by means of the spatula. The denture—a piece of bridgework O, for example—is grasped by the tweezers in a manner similar to that shown in Fig. 1 and held firmly with the assistance afforded by the projections, and the crown or crowns are filled with the plastic cement.

I claim—

1. In a heater for dental purposes a slab having on its surface sets of projections for holding artificial crowns and pieces of bridgework, substantially as specified.

2. In a heater for dental purposes a slab having on its surface sets of projections for holding artificial crowns and pieces of bridgework, and the projections having apertures through them, substantially as specified.

3. In a heater for dental purposes a slab having sets of projections on its surface for holding artificial crowns and pieces of bridgework, and a space on which to heat soften and work the cement for the crowns and bridgework, substantially as specified.

4. In a heater for dental purposes a slab having on its surface one or more sets of projections for holding artificial crowns or pieces of bridgework each set of projections comprising opposing members which inclose partly or entirely a space that conforms approximately to the shape of the denture it is designed to receive, substantially as specified.

In testimony that I claim the invention above set forth I have affixed my signature in presence of two witnesses.

GEORGE EVANS.

Witnesses:
WILTON C. DONN,
JOSEPH J. JACOBS.